United States Patent
Pamarthy et al.

(10) Patent No.: US 9,635,504 B2
(45) Date of Patent: Apr. 25, 2017

(54) LOCATION FRAUD DETECTION

(71) Applicant: Verizon Patent and Licensing Inc., Arlington, VA (US)

(72) Inventors: Kalyan Pamarthy, San Francisco, CA (US); Santanu Das, San Jose, CA (US); Abhijit Kudrimoti, San Diego, CA (US); Projit Aon, Princeton Junction, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 47 days.

(21) Appl. No.: 14/690,084

(22) Filed: Apr. 17, 2015

(65) Prior Publication Data
US 2016/0309296 A1 Oct. 20, 2016

(51) Int. Cl.
*H04W 24/00* (2009.01)
*H04W 4/02* (2009.01)
*H04W 4/00* (2009.01)

(52) U.S. Cl.
CPC ........... *H04W 4/023* (2013.01); *H04W 4/005* (2013.01); *H04W 4/028* (2013.01)

(58) Field of Classification Search
CPC .................................................. H04M 3/4228
USPC ......................................... 379/16; 455/456.1
See application file for complete search history.

(56) References Cited

U.S. PATENT DOCUMENTS 5,727,057 A * 3/1998 Emery ................ H04M 3/4228
379/16
9,049,117 B1 * 6/2015 Nucci .................... H04L 63/302

* cited by examiner

*Primary Examiner* — William D Cumming

(57) ABSTRACT

A method includes receiving, at a fraud management device, at least one BSID associated with communication data from at least one MTC device. The fraud management device determines a location associated with the at least one BSID. Relevant data elements are selected from the communication data. The fraud management device applies known domain rules to the communication data and identifies a connectivity pattern for the at least one MTC device based on the communication data. An anomaly detection model is applied to particular communication data associated with a particular MTC device based on the connectivity pattern, and at least one anomaly from the identified connection pattern is detected based on the anomaly detection model.

20 Claims, 9 Drawing Sheets

LOCATION FRAUD DETECTION

BACKGROUND

Machine to machine communication (M2M) allows (wireless and/or wired) systems to communicate with other devices without manual human interaction. M2M communication may include a wide range of applications for interaction between devices, such as monitoring and control for industrial automation, logistics, Smart Grid, Smart Cities, health, defense, etc. The data transferred during M2M communications may include different types and sizes that may be associated with different applications. For example, M2M communications may include short message, multimedia, etc.

M2M devices may transmit communication data that includes a time when M2M device (or associated devices) is communicating, a place from which the M2M device is communicating, and an amount of data that the M2M device is using. In some instances, the M2M devices may be authorized for use only at particular authorized areas or locations (e.g., locations associated with an organization such as a showroom, headquarters, client location, etc.). Location fraud for M2M devices may occur in instances in which the M2M devices are used outside of the authorized areas.

DETAILED DESCRIPTION

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may determine a location pattern associated with a machine to machine (M2M) or machine type communication (MTC) device. For example, the systems may receive base station data associated with a group of M2M devices. The systems may identify normal connection patterns associated with the group of M2M devices and perform anomaly detection based on received data associated with a particular M2M device included in the group of M2M devices. In instances in which the connectivity pattern (i.e., locations or base stations at which the M2M device connects to a network or is accessed) falls outside an identified normal connection pattern, the system may provide an alert that notifies relevant personnel of an abnormal location detected for the identified device.

Consistent with the embodiments described herein, the systems may include a monitoring device and/or dashboard associated with (or accessible by) a supervisor or other responsible personnel for the M2M device. The dashboard may display alarms and analytics based on detected deviation from the normal location based connection patterns. The dashboard may provide access to tools for mitigation of loss based on detected location fraud. The dashboard may also provide access to predictive tools for analysis of the detected location fraud.

Figure 1:
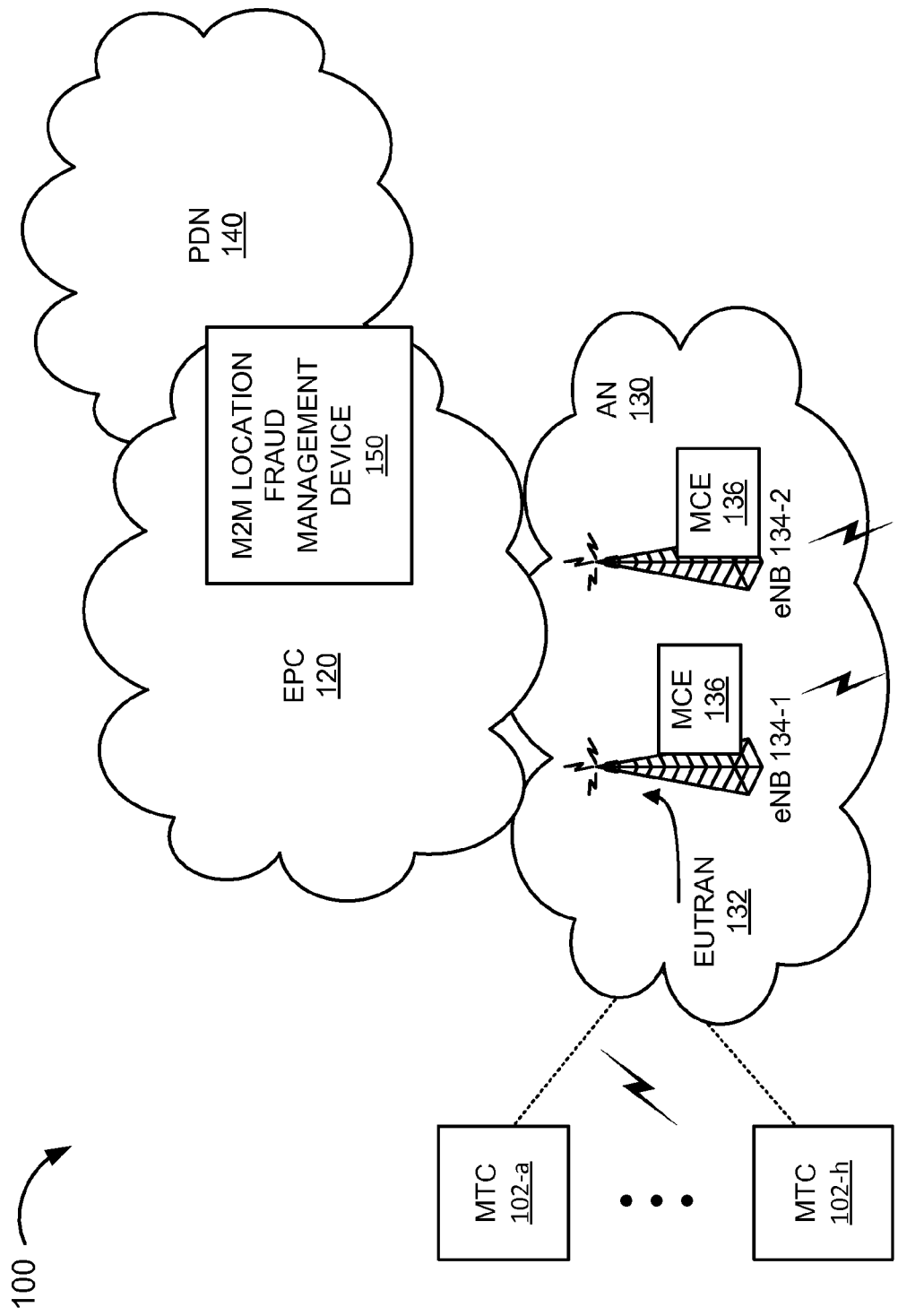
FIG. 1 is a diagram illustrating an exemplary environment including multiple M2M or machine type communication (MTC) devices and an M2M location fraud management device according to an implementation described herein.

FIG. 1 is a diagram of an environment 100 in which the systems and/or methods described herein may be implemented. As shown in FIG. 1, environment 100 may include multiple MTC 102a-102h (referred to in singular as MTC 102 or MTC device 102 and in plural as MTC 102), an evolved packet core (EPC) network 120, an access network (AN) 130, a packet data network (PDN) 140, such as the Internet or a proprietary packet data network, and a machine to machine (M2M) fraud management device 150. Two MTCs 102, a single EPC 120, a single M2M fraud management device 150, AN 130, and PDN 140 have been illustrated in FIG. 1 for simplicity. In practice, there may be more or fewer devices or components. For example, a typical environment 100 may include thousands or millions of MTCs 102, multiple M2M fraud management devices 150, ANs 130, etc.

MTC 102 may include a device that communicates with another device via machine to machine communications that does not include manual human input. MTC 102 may communicate via wireless and/or wired networks. MTC 102 may perform M2M or machine type communications, transmitting and receiving data over the networks displayed in environment 100. MTC 102 may include a wide range of applications for monitoring and control purposes in fields such as industrial automation, logistics, retail, Smart Grid, Smart Cities, health, defense, etc. MTC 102 operates according to one or more versions of the long term evolution (LTE) communication standard. MTC 102 may include any device that has a communication module that is not a single user device (or cell phone). MTC 102 may include moving or non-stationary (or potentially non-stationary) devices such as showroom devices (e.g., an in store mobile device), smart bikes, energy meters, smart meters, vending machines, telematics devices, network devices, service devices, service vehicles, etc.

M2M fraud management device 150 may include a device that identifies normal connection patterns based on locations associated with MTCs 102 and performs anomaly detection to determine anomalies based on received data (e.g., location and, in some instances, usage data) associated with each MTC 102, such as described herein below with respect to FIGS. 3 to 9. M2M fraud management device 150 may receive historical data and real time data generated over a service provider's network. M2M fraud management device 150 may be deployed in EPC 120 or PDN 140 to receive MTC location data (which may be included in regular communication data from MTCs 102). The MTC location data may include network data and application data associated with MTCs 102. The MTC location data may be cleaned and tagged (e.g., organized, associated with particular MTCs 102 and cleansed or errors and repetitive information) prior to ingestion into M2M fraud management device 150. M2M fraud management device 150 may perform as an analytics engine for location based fraud associated with MTCs 102 that generate the data. M2M fraud management device 150 may identify normal connection patterns associated with the MTC 102 devices to establish an expected location or location pattern (e.g., a radius, geographical footprint (Geo-print) which a specific satellite may be reached) of the MTC 102. M2M fraud management device 150 may subsequently issue an alarm (or alert) of abnormal location detected for the MTC device 102 in instances in which a connectivity pattern falls outside of a learned location pattern.

EPC 120 may include a core network architecture of the Third generation partnership project (3GPP) LTE wireless communication standard. EPC 120 may include components or devices (not shown separately) that enable communication via MTC 102, such as a mobility management entity (MME), a serving gateway (SGW), and a PDN gateway (PGW). A broadcast multicast service center (BMSC), and a multimedia broadcast multicast service gateway (MBMS GW) may also be deployed in EPC 120.

AN 130 may include an evolved universal terrestrial radio access network (E-UTRAN) 132 and a number of eNodeBs (eNBs) 134-1 and 134-2 or enhanced node base stations (collectively referred to as eNBs 134 or individually as eNB 134). Each eNB 134 may include a corresponding multicast coordination entity (MCE) 136. Access network 130 includes a communications network that connects subscribers (e.g., user device 110) to a service provider. In one example, access network 130 may include a Wi-Fi network or other access networks (e.g., in addition to E-UTRAN 132).

eNBs 134 includes network devices that operate according to one or more versions of the LTE communication standard. For example, eNBs 134 may be configured to respond to requests from MTC 102, forward information regarding MTC 102 to EPC 120, etc.

PDN 140 includes a network that provides data services (e.g., via packets or any other Internet protocol (IP) datagrams). For example, PDN 140 may include the Internet, an intranet, an asynchronous transfer mode (ATM) network, etc. PDN 140 includes a network that provides data services (e.g., via packets or any other Internet protocol (IP) datagrams).

In implementations described herein, systems and methods may determine normal location based connection patterns associated with M2M devices and perform anomaly detection to determine anomalies that indicate probable location fraud based on received data associated with the M2M devices. In instances in which the location based connectivity pattern falls outside the normal connection pattern, the systems may provide a descriptive output that informs an enterprise customer that an event is happening that deviates from the normal location based connection patterns.

Figure 2:
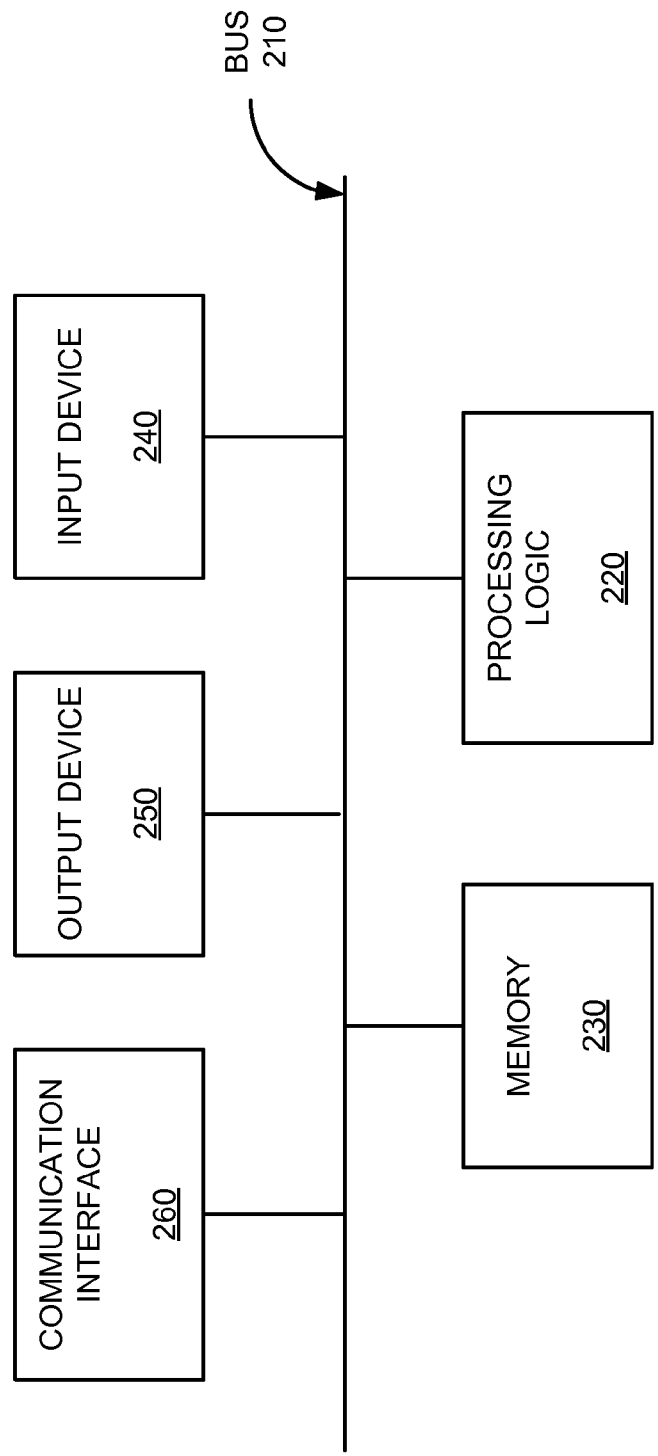
FIG. 2 is a block diagram of exemplary components of a device that may correspond to any of the devices of FIG. 1.

FIG. 2 is a diagram of example components of a device 200. Each of user device 102, one or more devices in EPC 120, AN 130, E-UTRAN 132, eNB 134, MCE 136, PDN 140, or M2M fraud management device 150 as described in FIG. 1 above, may include one or more devices 200. As shown in FIG. 2, device 200 may include a bus 210, a processing logic 220, a memory 230, an input device 240, an output device 250, and a communication interface 260.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control, etc. Output device 270 may include a mechanism that outputs information to the operator, including a display, a printer, a speaker, etc. Communication interface 280 may include a transceiver that enables device 200 to communicate with other devices and/or systems. For example, communication interface 280 may include mechanisms for communicating with another device or system via a network, such as network 160.

As described herein, device 200 may perform certain operations in response to processing logic 220 executing machine-readable instructions (i.e., software instructions) contained in a computer-readable medium, such as main memory 230. A computer-readable medium may be defined as a physical or logical memory device. The machine-readable instructions may be read into main memory 230 from another computer-readable medium, such as storage device 250, or from another device via communication interface 280. The machine-readable instructions contained in main memory 230 may cause processing logic 220 to perform processes described herein. Alternatively, hard-wired circuitry may be used in place of or in combination with machine-readable instructions to implement processes described herein. Thus, implementations described herein are not limited to any specific combination of hardware devices, circuitry, and/or machine-readable instructions.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
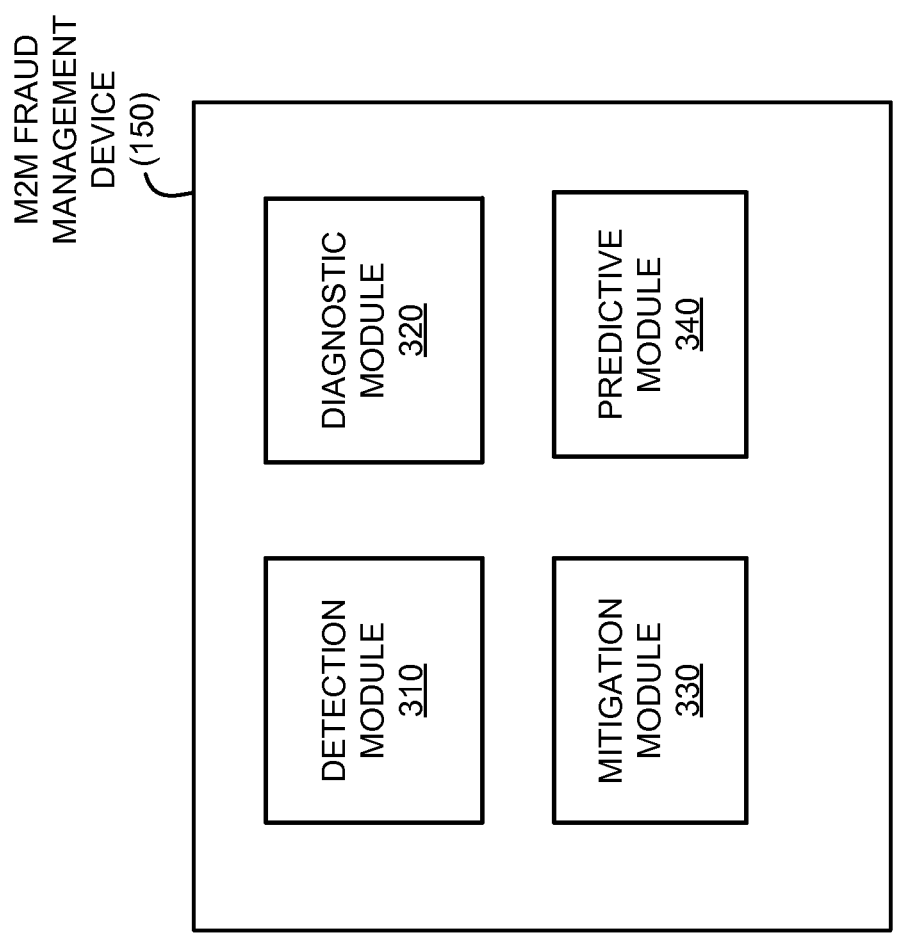
FIG. 3 is a diagram of exemplary functional components of the M2M location fraud management device of FIG. 1.

FIG. 3 is a diagram of an exemplary M2M fraud management device 150. M2M fraud management device 150 may comprise machine-readable instructions, hardware, or a combination of hardware and machine-readable instructions. M2M fraud management device 150 may include a detection module 310, a diagnostic module 320, a mitigation module 330, and a predictive module 340. The configuration of components of M2M fraud management device 150 illustrated in FIG. 3 is for illustrative purposes only. Other configurations may be implemented. Therefore, M2M fraud management device 150 may include additional, fewer and/or different components than those depicted in FIG. 3.

Detection module 310 may identify normal location based connection patterns associated with the MTC devices 102. Detection module 310 may determine anomalies in the location of the MTC devices 102 based on received data associated with the MTC 102, such as described herein below with respect to FIG. 4. Detection module 310 may receive base station data from base stations (e.g., eNBs 134) associated with each MTC 102. The location based data may include raw (or unsorted) data that is collected over a predetermined time and stored in a historical database for later analysis (e.g., communications from the MTCs 102 over a selected or predetermined period, such as a year or more, etc.). Detection module 310 may apply filters and normalization algorithms to received location data associated with identified MTCs 102. Detection module 310 may identify normal location based connection patterns, perform anomaly detection (e.g., statistical, clustering and time series analysis) and identify anomalies in the location of the MTC 102.

Diagnostic module 320 may receive indications of anomalies in a location pattern associated with a particular MTC 102 or MTCs 102 from detection module 310. Diagnostic module 320 may determine whether the probable cause of the identified anomaly is generated based on unauthorized movement and/or location of a particular MTC device 102, such as described herein below with respect to FIG. 5. Diagnostic module 320 may detect a historical pattern of location fraud.

Mitigation module 330 may provide a capability to mitigate losses associated with location fraud of an MTC 102 when the location fraud is identified. Mitigation module 330 may issue an alert (or raise an alarm) that indicates that an abnormal location has been detected for MTC 102 when the location based connectivity pattern associated with a particular device falls outside learned location pattern, such as described below with respect to FIG. 6. Mitigation module 330 may output alerts and other location data associated with the MTCs 102 to dashboards that display alarms and analytics, such as described with respect to FIG. 8 below. Mitigation module 330 may allow the user to exert remote control over the MTCs 102 and the access to resources by the MTC 102 (e.g., network access, global position system (GPS) tracking, shut down of applications or features on the MTC 102). Mitigation module 330 may implement prevention strategies that block or minimize the effects of location fraud.

Predictive module 340 may predict when location fraud is likely to occur based on patterns observed in the location based data, such as described herein below with respect to FIG. 7. Predictive module 340 may predict likely location fraud based on parameters associated with each particular MTC 102, such as a type of MTC 102, a general location of the MTC 102, storage conditions associated with the MTC 102, a recent location pattern associated with the MTC 102, a number of people authorized to access the MTC 102, etc.

Figure 4:
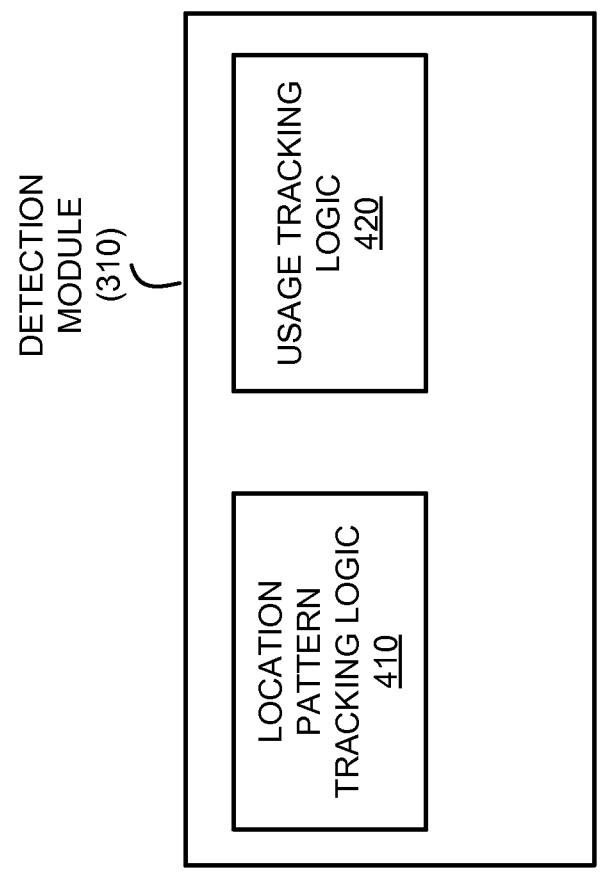
FIG. 4 depicts a functional block diagram of the detection module of FIG. 3.

FIG. 4 is an exemplary functional block diagram of detection module 310. As shown in FIG. 4, detection module 310 may include location pattern tracking logic 410 and location detection logic 420. Other configurations may be implemented. Therefore, detection module 310 may include additional, fewer and/or different components than those depicted in FIG. 4.

Location pattern tracking logic 410 may collect information associated with the location of MTCs 102. For example, location pattern tracking logic 410 may collect base station identifiers (BSIDs), and signal strengths associated with MTCs 102 with regard to each base station. In other implementations, location pattern tracking logic 410 may collect global positioning system (GPS) information associated with the MTCs 102. Location pattern tracking logic 410 may apply normalization processes to the data from the MTCs 102 to ensure that the data is on a same scale and has the same attributes (e.g., to ensure that data points are comparable). MTCs 102 may be selected for inclusion in a group based on common characteristics of users, types of applications, uses of the MTCs 102, types of MTCs 102, etc. Location pattern tracking logic 410 may determine a location of the MTC 102 based on the signal strength and BSID of the base station to which the MTC 102 connects.

Location pattern tracking logic 410 may receive a base station location almanac that describes the coordinates (e.g., latitude and longitude) of the identified base stations. The location of base stations from which the MTCs 102 access or interact with the network may be determined by correlating the transmitted data from the MTCs 102 (e.g., BSIDs) with the locations of the base stations provided in the base station location almanac. Location pattern tracking logic 410 may track the location of each MTC 102 or a group of MTCs 102 for a sufficient time (e.g., based on BSIDs) to identify a stable pattern or patterns in the movement and location of the MTCs 102. Location pattern tracking logic 410 may track the location pattern and changes to the pattern of each MTC 102 or group of MTCs 102.

Location detection logic 420 may detect whether the MTC 102 conforms to normal location patterns based on the location behavior (i.e., places that the MTCs 102 visits or is located) over a window of time (e.g., 6 months, a year, etc.). Location detection logic 420 may receive an input of one or more BSIDs each time that there are M2M communications between the MTC 102 and other machine type communication devices. Location detection logic 420 may identify a particular base station that the MTC 102 is connected to and then use a base station almanac to determine the location of the base station (e.g., California at a particular latitude and longitude). Location detection logic 420 may take measurements over months (i.e., perform data collection processes) every time that the MTC 102 connects.

Figure 5:
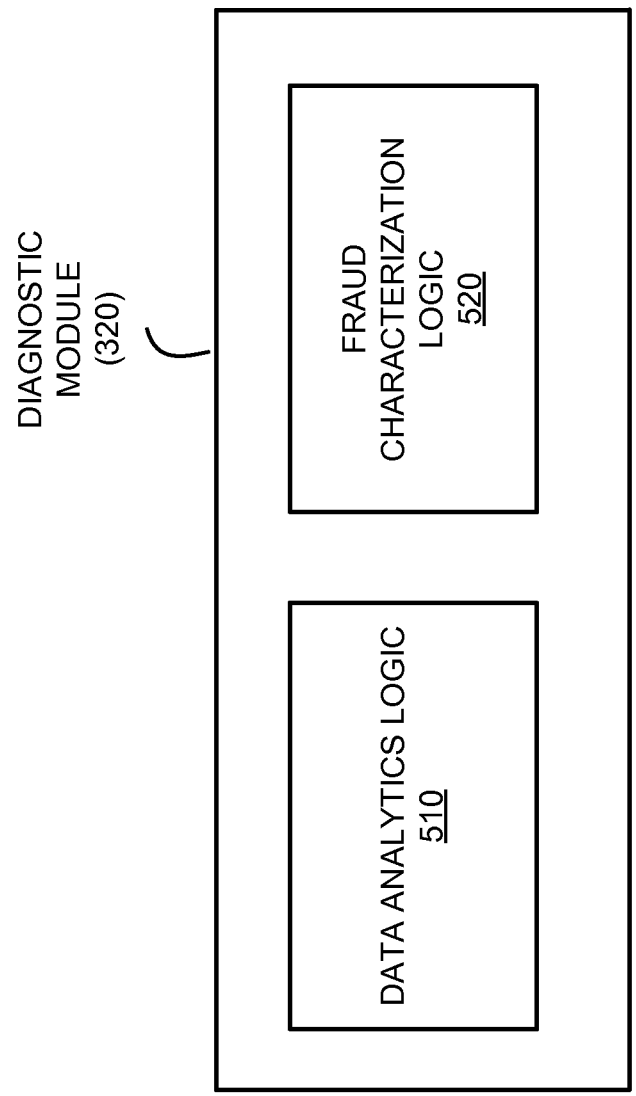
FIG. 5 depicts a functional block diagram of the diagnostic module of FIG. 3.

FIG. 5 is an exemplary functional block diagram of diagnostics module 320. As shown in FIG. 5, diagnostics module 320 may include data analytics logic 510 and fraud characterization logic 520. Other configurations may be implemented. Therefore, diagnostics module 320 may include additional, fewer and/or different components than those depicted in FIG. 5.

Data analytics logic 510 may consider different types of M2M data (e.g., sensor data, application data, network data, etc.). Preprocessing of the data may include the selection of relevant data elements and the application of known domain rules that incorporate existing knowledge (e.g., each MTC 102 always connects to 3 base stations). Known domain rules may include rules that may be applied to a group or subgroup of MTCs 102, which may be provided or detected prior to analysis by data analytics logic 510. The known domain rules may define or articulate standard behavior associated with the groups or subgroups of MTCs 102.

Data analytics logic 510 may use various methods of analysis and statistical and quantitative tools to determine location patterns from the data provided by MTCs 102. Data analytics logic 510 may process the data to structure and identify location patterns (e.g., based on statistical analysis of the location data). For example, data analytics logic 510 may perform clustering analysis based on data associated with (e.g., multiple different) MTCs 102 from different times and different locations (e.g., having different location patterns). Data analytics logic 510 may perform time based analysis of the data to identify location patterns. For example, data analytics logic 510 may identify a daily set of location patterns in which the MTC 102 moves once a day between different sets of locations at an approximate time (e.g., a morning pattern in which the MTC 102 connects to a particular set of base stations A, B, and C and an evening pattern in which the MTC 102 connects to another set of base stations G, H, and F).

Data analytics logic 510 may determine (or define) the parameters of location behavior that constitutes a normal location pattern for the MTC 102 or class of MTCs 102 and then monitor the location behavior of each MTC 102. Data analytics logic 510 may analyze the current location behavior of the MTC 102 to determine fraud based on single points of deviation (e.g., the MTC 102 may exceed a particular radius from a particular home location of the MTC 102) or deviations in pattern (e.g., the MTC 102 may connect to a particular set of base stations at a time (or for a period of time) that indicates that there is no business activity involved). For example, a particular MTC 102 may connect to a certain range of base stations. The range of base stations may be based on the number of base stations, geographic area, etc. Data analytics logic 510 may monitor the location behavior to identify deviations and when the deviations exceed a threshold may indicate that an anomaly has been detected.

Data analytics logic 510 may apply normalization and determine anomalies over particular cycles (e.g., a day, week, etc.) associated with the normal location pattern. For example, data analytics logic 510 may receive data from different MTCs 102 over different periods and apply normalization to make different datasets compatible and comparable.

Fraud characterization logic 520 may identify different types of probable fraud based on different types of anomalies in the data. Fraud characterization logic 520 may receive notification that a connectivity pattern falls outside learned connection pattern for legitimate usage of the MTC 102. Fraud characterization logic 520 may compare the anomaly (or anomalies) to previous anomalies and raise an alarm that indicates that an abnormal location has been detected for device if the anomaly corresponds to probable fraud. Fraud characterization logic 520 may provide notification that a likely cause of the anomaly is unauthorized movement (and/or an unauthorized location) of MTC device 102.

Figure 6:
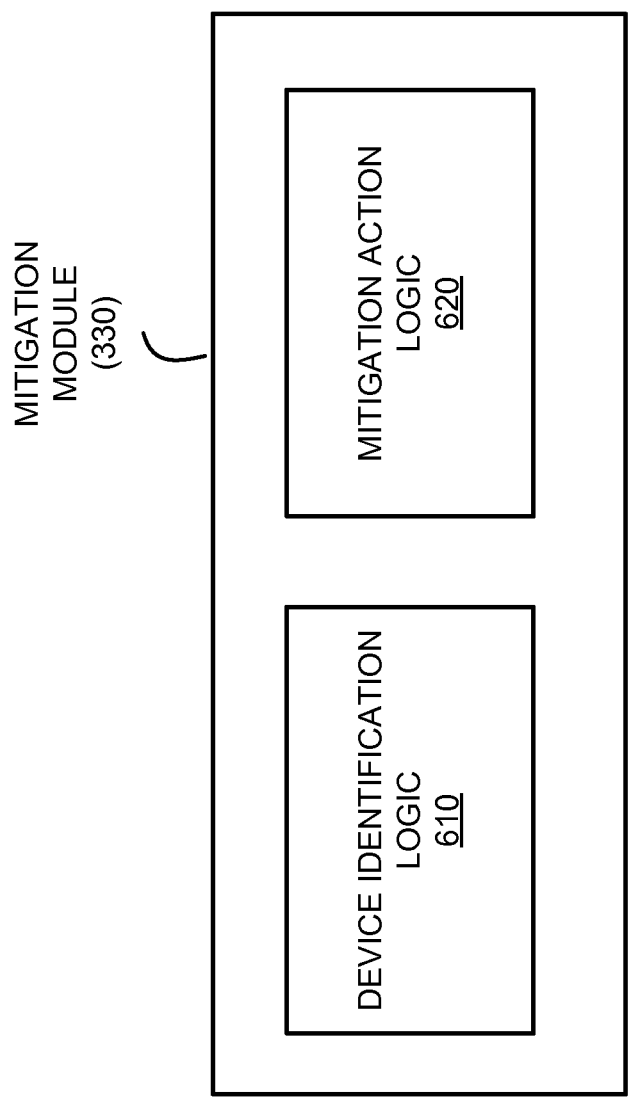
FIG. 6 depicts a functional block diagram of the mitigation module of FIG. 3.

FIG. 6 is an exemplary functional block diagram of mitigation module 330. As shown in FIG. 6, mitigation module 330 may include device identification logic 610 and mitigation action logic 620. Other configurations may be implemented. Therefore, mitigation module 330 may include additional, fewer and/or different components than those depicted in FIG. 6.

Device identification logic 410 may receive information and may identify MTCs 102 that are associated with anomalies or probable location fraud. Device identification logic 410 may determine attributes associated with the MTC 102, such as a user identification assigned to the MTC 102, authorizations associated with the MTC 102, capabilities and data usage associated with the MTC 102, recent activity of the MTC 102, etc.

Mitigation action logic 410 may generate an alert an alert that notifies a monitoring device or dashboard associated with (or accessible by) a supervisor for the M2M device about an identified abnormal location for the particular M2M device. Mitigation action logic 410 may determine and implement prevention strategies based on the detected anomalies and observed location fraud. For example, in instances in which a particular type of location fraud is detected, mitigation action logic 410 may recommend particular actions to take in order to mitigate or prevent the fraud. Mitigation action logic 410 may report insights into probable location fraud and the recent locations of the MTC 102 and provide one or more options that the supervisor may enact to mitigate the location fraud. For example, mitigation action logic 410 may take actions such as identifying the MTC device 102, investigating the current location, tracking the changes in location, and restoring a device to its original location.

Figure 7:
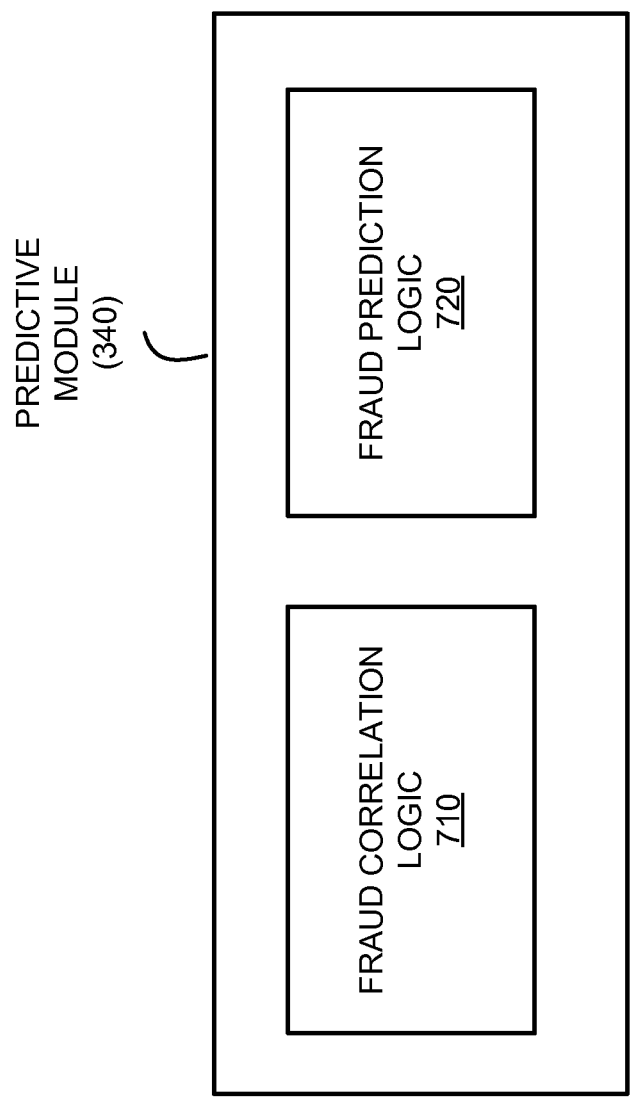
FIG. 7 depicts a functional block diagram of the predictive module of FIG. 3.

FIG. 7 is an exemplary functional block diagram of predictive module 340. As shown in FIG. 7, predictive module 340 may include fraud correlation logic 710 and fraud prediction logic 720. Other configurations may be implemented. Therefore, predictive module 340 may include additional, fewer and/or different components than those depicted in FIG. 7.

Fraud correlation logic 710 may identify historical incidences of location fraud and correlate location behavior with the location fraud. For example, fraud correlation logic 710 may identify proven cases of location fraud and isolate activity that correlates only (or strongly correlates) to the location fraud. Fraud correlation logic 710 may identify current instances of the behavior that strongly correlates to location fraud.

Fraud prediction logic 720 may predict location fraud based on historical data. For example, fraud prediction logic 720 may predict likely location fraud based on parameters associated with each particular MTC 102, such as a type of MTC 102, a general location of the MTC 102, storage conditions associated with the MTC 102, etc. Fraud prediction logic 720 may incorporate known information regarding types of parameters associated with particular MTCs 102 into models based on historical data to determine predictions of location fraud that may be applied to groups of MTCs 102 or a single MTC 102.

Figure 8:
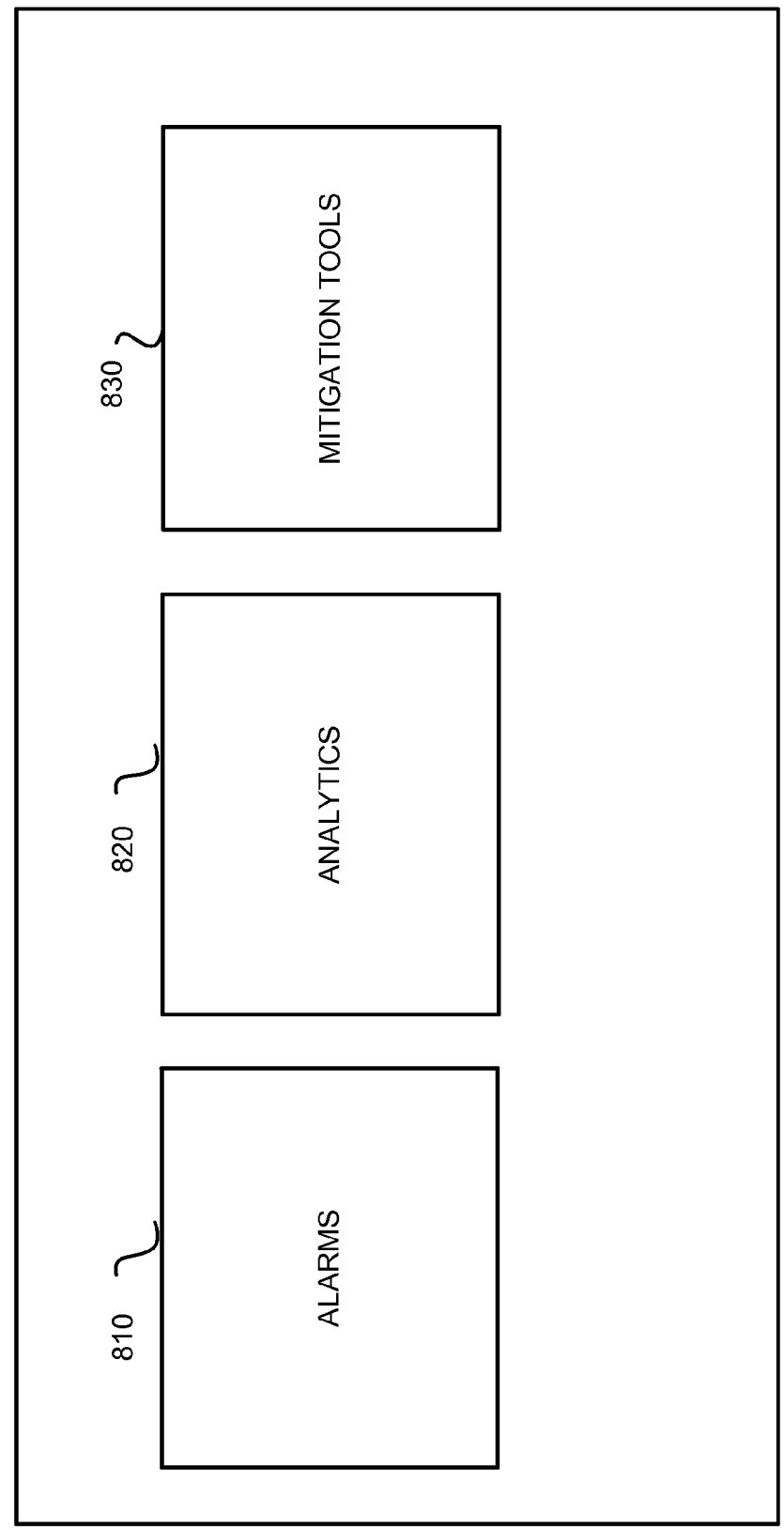
FIG. 8 is an exemplary location fraud detection dashboard interface.

FIG. 8 is an exemplary location fraud detection dashboard interface 800. As shown in FIG. 8, location fraud detection dashboard interface 800 may provide graphical elements that include a representation of alarms 810, analytics 820 and mitigation tools 830.

Location fraud detection dashboard interface 800 may be presented (or accessed) in a display via a web browser, user device, etc. Location fraud detection dashboard interface 800 may be accessible by supervisory and administrative personnel associated with MTCs 102 with appropriate authorization and encryption. Location fraud detection dashboard interface 800 may provide capability for a user to find location patterns, and digitally monitor behavior of all MTCs 120 including MTCs 102 that are flagged for concerns of possible location fraud.

Alarms 810 may provide alerts regarding behavior, actions, or incidents associated with particular MTCs 102 that indicate possible location fraud. Alarms may be about usage, connectivity, or location (e.g., based on BSID). Each alarm may result in one or more actions, for example take action on detected possible fraud to monitor or mitigate. For example, alarms 810 may provide a visual, haptic and/or aural alert in instances in which possible location fraud is detected. The alarms 810 may be provided on the basis of the detected location fraud or in conjunction with other detected attributes of the subject MTC 102, such as network access, data usage, etc.

Analytics 820 may provide the capability to analyze the location behavior of MTCs 102. Analytics 820 may allow a user to analyze the behavior of a single MTC 102 or a group of MTCs 102. Analytics 820 may provide information based on different groupings of MTCs 102 and based on different time spans, activities, common location behavior that indicates location fraud, etc. Location behavior may indicate places that the MTC 102 is located at based on, for example, BSIDs provided in the MTC data.

Mitigation tools 830 may enable a supervisory user for the MTCs 102 to mitigate or prevent business losses and other actions associated with MTCs 102 based on detected probable (or possible) location fraud. For example, mitigation tools 830 may provide capabilities of changing required access associated with MTCs 102. The supervisory user may be provided with a capability to restrict access by the MTC 102 to networks, accounts, etc. Mitigation tools 102 may also allow the supervisory user to monitor and investigate activity associated with a subject MTC 102.

Although the user interface in FIG. 8 depicts a variety of information, in other implementations, the user interface may depict less information, additional information, different information, or differently arranged information than depicted in FIG. 8.

Figure 9:
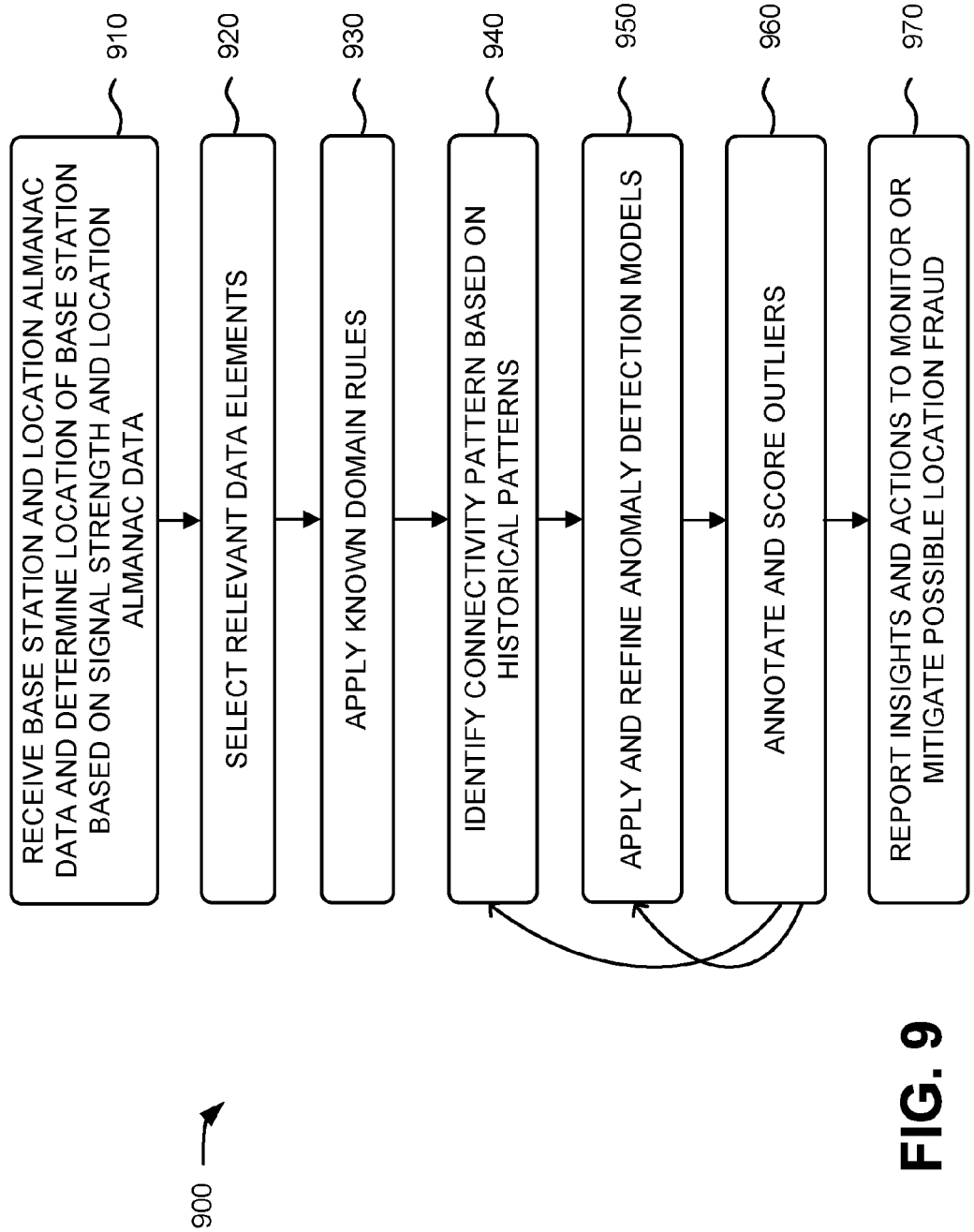
FIG. 9 is a flow chart of an exemplary process for detecting location fraud associated with an MTC device according to an implementation described herein.

FIG. 9 is a flow chart of an exemplary process for detecting location fraud associated with an MTC device according to implementations described herein. In one implementation, process 900 may be performed by M2M fraud management device 150. In another implementation, some or all of process 900 may be performed by another device or group of devices, including or excluding M2M fraud management device 150.

As shown in FIG. 9, M2M fraud management device 150 may receive base station and location almanac information associated with a particular MTC 102 (block 910). For example, M2M fraud management device 150 may receive M2M communication data generated by MTCs 102 in environment 100. M2M fraud management device 150 may parse the communication data to identify BSIDs associated with base stations at which the MTCs 102 connected to a network.

M2M fraud management device 150 may select relevant data elements (block 920). For example, M2M fraud management device 150 may analyze the communication data to determine relevant data elements to the monitoring of MTCs 102 and location fraud. Examples of relevant data elements include user identifications associated with the MTCs 102, geographic location, types of data transmitted, MTC 102 groupings, etc.

M2M fraud management device 150 may apply known domain rules that are applicable to the location behavior of the MTCs 102 (block 930). M2M fraud management device 150 may incorporate existing knowledge that applies to the location behavior of the MTC 102. M2M fraud management device 150 may apply rules based on the number of base stations, the frequency of connection to base stations and the length of time of communication at the base station for each MTC 102 over defined time windows. Known domain rules may be based on past analysis of location fraud and general behavior of groups of MTCs 102. For example, if a device is supposed to be stationary, such as a smart meter, in instances in which the device begins connecting to multiple base stations, M2M fraud management device 150 may use that as a key to generate alarms. This is in addition to applying pattern recognition technologies to learn new rules. In another example, each MTC 102 device may always connects to three base stations. In a further example, each MTC 102 may be required to be signed in at a particular location within a predetermined time of completion of a service call.

At block 940, M2M fraud management device 150 may identify connectivity patterns associated with the particular MTC 102. For example, M2M fraud management device 150 may identify instances at which MTCs 102 connect to a network and the BSIDs of base stations at which the MTCs 102 connect to the network. M2M fraud management device 150 may identify a pattern of connection to the network.

M2M fraud management device 150 may apply and define anomaly detection models (block 950). M2M fraud management device 150 may access anomaly detection models that normalize and filter the communication data to generate normal location patterns. For example, M2M fraud management device 150 may apply statistical, clustering and/or time series analysis. The anomaly detection models may be applied to the data set of communication data associated with particular MTCs 102.

At block 960, M2M fraud management device 150 may annotate and score outliers. M2M fraud management device 150 may identify particular anomalies (i.e., location behavior) that deviate from the normal location patterns. M2M fraud management device 150 may score outliers based on a level of deviation from the normal location patterns. M2M fraud management device 150 may score outliers based on factors, such as the frequency of connections to base stations and the geo-print of the MTCs 102. The annotations and information generated at block 960 may be used at block 940 to refine the identification of the connectivity pattern.

M2M fraud management device 150 may report insights and actions (block 970). M2M fraud management device 150 may compile and analyze information associated with the subject MTCs 102. M2M fraud management device 150 may also provide insights into possible behavior associated with the location fraud. M2M fraud management device 150 may also provide alerts to probable location fraud and mitigation tools, such as described hereinabove with respect to FIG. 8.

Systems and/or methods described herein may determine a location pattern associated with a MTC device. The systems may identify normal connection patterns associated with the group of M2M devices. The systems may perform anomaly detection to determine anomalies based on received data associated with a particular M2M device that may be included in the group of M2M devices.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 9, the order of the blocks may be modified in other implementations. Further, non-dependent blocks may be performed in parallel.

It will be apparent that different aspects of the description provided above may be implemented in many different forms of machine-readable instructions, firmware, and hardware in the implementations illustrated in the figures. The actual machine-readable instructions or specialized control hardware used to implement these aspects is not limiting of the invention. Thus, the operation and behavior of these aspects were described without reference to the specific machine-readable instructions—it being understood that machine-readable instructions and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and machine-readable instructions.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
    receiving, at a fraud management device, at least one base station identifier (BSID) associated with communication data from at least one machine type communication (MTC) device;
    determining a location associated with the at least one BSID;
    selecting data elements from the communication data;
    applying known domain rules to the communication data;
    identifying a connectivity pattern for the at least one MTC device based on the communication data;
    applying an anomaly detection model to particular communication data associated with a particular MTC device based on the connectivity pattern; and
    detecting at least one anomaly from the identified connectivity pattern based on the anomaly detection model.

2. The computer-implemented method of claim 1, further comprising:
    providing, to at least one device associated with a supervisor associated with the at least one MTC device, an alert indicating that probable location fraud is detected.

3. The computer-implemented method of claim 1, wherein applying the known domain rules to the communication data further comprises applying a rule based on at least one of a number of base stations, a frequency of connection to base stations, and a length of time of communication at the base station.

4. The computer-implemented method of claim 1, wherein identifying the connectivity pattern further comprises:
    applying at least one filter and at least one normalization process to the communication data.

5. The computer-implemented method of claim 1, wherein applying the anomaly detection model further comprises:
    applying at least one of statistical, clustering, or time series analysis to the particular communication data.

6. The computer-implemented method of claim 1, further comprising:
    mitigating probable location fraud based on the detected at least one anomaly.

7. The computer-implemented method of claim 1, wherein detecting the at least one anomaly from the identified connectivity pattern further comprises:
    detecting a historical pattern of location fraud.

8. The computer-implemented method of claim 1, further comprising:
    providing a graphical user interface (GUI) for managing location fraud associated with the particular MTC device, wherein the GUI includes one or more of alarms, analytics, and mitigation tools associated with location fraud for the particular MTC device.

9. The computer-implemented method of claim 1, wherein the MTC device includes one of a device for industrial automation, logistics, retail, Smart Grid, Smart Cities, health, or defense.

10. The computer-implemented method of claim 1, wherein determining the location associated with the at least one BSID further comprises:
    receiving a signal strength associated with the BSID and the particular MTC device;
    receiving a location almanac for a plurality of base stations that includes the at least one BSID; and
    determining a location of the MTC device based on the signal strength and the location associated with the at least one BSID.

11. The computer-implemented method of claim 1, further comprising:
    monitoring the particular MTC device based on detected location fraud.

12. A device, comprising:
    a memory to store a plurality of instructions; and
    a processor configured to execute instructions in the memory to:
        receive at least one base station identifier (BSID) associated with communication data from at least one machine type communication (MTC) device;
        determine a location associated with the at least one BSID;
        select data elements from the communication data;
        apply known domain rules to the communication data;
        identify a connectivity pattern for the at least one MTC device based on the communication data;
        apply an anomaly detection model to particular communication data associated with a particular MTC device based on the connectivity pattern; and
        detect at least one anomaly from the identified connectivity pattern based on the anomaly detection model.

13. The device of claim 12, wherein the processor is further configured to:
    provide, to at least one device associated with a supervisor associated with the at least one MTC device, an instruction to issue an alert that probable location fraud is detected.

14. The device of claim 12, wherein, when applying the known domain rules to the communication data, the processor is further configured to:
    apply a rule based on at least one of a number of base stations, a frequency of connection to base stations, and a length of time of communication at the base station.

15. The device of claim 12, wherein, when identifying the connectivity pattern, the processor is further configured to:
    apply at least one filter and at least one normalization process to the communication data.

16. The device of claim 12, wherein, when applying the anomaly detection model, the processor is further configured to:
    apply at least one of statistical, clustering, or time series analysis to the particular communication data.

17. The device of claim 12, wherein the processor is further configured to:
    mitigate probable location fraud based on the detected at least one anomaly.

18. The device of claim 12, wherein the processor is further configured to:
    provide an instruction to output a graphical user interface (GUI) for managing location fraud associated with the particular MTC device, wherein the GUI includes one or more of alarms, analytics, and mitigation tools associated with location fraud for the particular MTC device.

19. A non-transitory computer-readable medium including instructions to be executed by a processor, the instructions including one or more instructions, when executed by the processor, for causing the processor to:

receive at least one base station identifier (BSID) associated with communication data from at least one machine type communication (MTC) device;

determine a location associated with the at least one BSID;

select data elements from the communication data;

apply known domain rules to the communication data;

identify a connectivity pattern for the at least one MTC device based on the communication data;

apply an anomaly detection model to particular communication data associated with a particular MTC device based on the connectivity pattern; and detect at least one anomaly from the identified connectivity pattern based on the anomaly detection model.

20. The non-transitory computer-readable medium of claim 19, wherein the one or more instructions further include instructions to:

provide an instruction to output a graphical user interface (GUI) for managing location fraud associated with the particular MTC device, wherein the GUI includes one or more of alarms, analytics, and mitigation tools associated with location fraud for the particular MTC device.

* * * * *